United States Patent

Kovac et al.

(10) Patent No.: US 7,857,582 B2
(45) Date of Patent: Dec. 28, 2010

(54) ABRADABLE LABYRINTH TOOTH SEAL

(75) Inventors: Joshua D. Kovac, Oviedo, FL (US); Hubertus E. Paprotna, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 38 days.

(21) Appl. No.: 12/370,918

(22) Filed: Feb. 13, 2009

(65) Prior Publication Data
US 2009/0142189 A1    Jun. 4, 2009

Related U.S. Application Data

(62) Division of application No. 11/441,895, filed on May 26, 2006, now abandoned.

(51) Int. Cl.
*F01D 11/02* (2006.01)
(52) U.S. Cl. .................. 415/173.7; 415/174.4
(58) Field of Classification Search ............. 415/173.7, 415/174.4, 174.5, 174.2, 230
See application file for complete search history.

(56) References Cited

U.S. PATENT DOCUMENTS

| | | | |
|---|---|---|---|
| 4,063,742 A | 12/1977 | Watkins, Jr. | |
| 4,177,004 A | 12/1979 | Riedmiller et al. | |
| 4,346,904 A | 8/1982 | Watkins, Jr. | |
| 4,526,508 A * | 7/1985 | Antonellis et al. | 415/173.7 |
| 5,143,383 A | 9/1992 | Glynn et al. | |
| 5,967,746 A | 10/1999 | Hagi et al. | |
| 6,220,814 B1 | 4/2001 | Brushwood et al. | |
| 6,652,226 B2 | 11/2003 | Albrecht, Jr. et al. | |
| 6,962,342 B2 | 11/2005 | Wieghardt | |

* cited by examiner

*Primary Examiner*—Richard Edgar

(57) ABSTRACT

A seal assembly (52, 54) for a gas turbine engine (10). The seal assembly (52, 54) includes a first seal member (40) including an abradable structure having at least first and second seal portions (58, 64) radially spaced from each other, and a second seal member (44) including first and second seal surfaces (56, 62) located in facing relationship to the first and second seal portions (58, 64), respectively. The first seal member (40) is formed of a honeycomb structure, and the first seal portion (58) of the first seal member (40) is a thin fin-like structure having a width in the axial direction of the turbine engine (10) that is less than the width of the second seal portion (64) in the axial direction.

14 Claims, 2 Drawing Sheets

ABRADABLE LABYRINTH TOOTH SEAL

CROSS-REFERENCE TO RELATED APPLICATIONS

This application is a divisional of and claims priority to U.S. patent application Ser. No. 11/441,895 filed May 26, 2006, which application is herein incorporated by reference in its entirety as if fully set forth herein.

FIELD OF THE INVENTION

This invention relates in general to seals for multistage rotary machines and, more particularly, to a seal assembly for providing interstage leakage control in a multistage turbine engine comprising a rotating rotor disk supporting blades and stationary vanes located adjacent to the blades.

BACKGROUND OF THE INVENTION

In various multistage rotary machines used for energy conversion, such as turbines, a fluid is used to produce rotational motion. In a gas turbine, for example, a gas is compressed through successive stages in a compressor and mixed with fuel in a combustor. The combination of gas and fuel is then ignited for generating combustion gases that are directed to turbine stages to produce the rotational motion. The turbine stages and compressor stages typically have stationary or non-rotary components, e.g., vanes, that cooperate with rotatable components, e.g., rotor blades, for compressing and expanding the operational gases.

Any fluid leakage between stages reduces overall gas turbine engine performance and efficiency and therefore, interstage seals in seal housings are provided to reduce such leakage. In general, fluid leakage is reduced when the gap between the seal and a rotor assembly is minimized. Labyrinth seals have been used to effect a seal between stages at different pressures in gas turbine engines. Such seals generally comprise two principal elements, i.e., a rotating seal and a static seal. The static seal, as viewed in cross section parallel to the axial length of the engine, frequently has rows of thin labyrinth fingers or teeth, typically formed of stainless steel, extending radially from a relatively thicker base. The teeth of the static seal extend radially to a location adjacent the rotating seal. If contact occurs between the labyrinth teeth and the rotating seal, the stainless steel teeth may harden, and wire-like strips of the tooth material may be liberated from the labyrinth teeth. These so called "seal wires" enter the flow path and may cause significant damage to diaphragm airfoils, often resulting in forced outages to repair the damage. Accordingly, labyrinth seals have generally been designed to allow sufficient clearance to avoid problems associated with contact between the labyrinth teeth and the adjacent seal surfaces, allowing a certain amount of leakage with an associated loss of performance.

It is also known to form the static seal or stator with a honeycomb configuration for cooperating with a rotating seal component, such as a rotary seal arm having a plurality of sharp seal teeth. These principal elements are positioned with a small radial gap therebetween to permit assembly of the rotating and static components. When the gas turbine engine is operated, the rotating seal expands radially more than the static seal and rubs into the static seal. The thin honeycomb construction of the static seal reduces the surface area on which the seal teeth rub and thus helps to minimize the heat transferred into the rotating seal.

It is an object of the present invention to provide a seal construction for a multistage rotary machine that does not require teeth to form a seal between stationary and rotating seal components. It is a further object of the invention to provide such a seal construction in which a gap between seal components may be reduced, and in which heat produced by abrading contact between such components may be minimized.

SUMMARY OF THE INVENTION

In accordance with one aspect of the invention, a seal assembly is provided for a turbine engine comprising a rotating rotor disk supporting blades, stationary vanes located adjacent to the blades, and an axially extending rotor arm supported on the rotor disk and located radially inwardly from the blades. The seal assembly comprises a first seal member comprising a honeycomb structure supported on a radially inner end of the stationary vanes, and a second seal member located on the rotor arm and comprising first and second seal surfaces wherein the second seal surface is radially spaced from the first seal surface. The first seal member includes a first seal portion located in facing relationship to the first seal surface to form a seal therebetween, and a second seal portion located in facing relationship to the second seal surface to form a seal therebetween. The first seal portion comprises axially spaced upstream and downstream edges located radially inwardly from the second seal portion and defines a width in an axial direction of the turbine engine that is less than the width of the second seal portion in the axial direction.

In accordance with a further aspect of the invention, a seal assembly is provided for a turbine engine comprising a rotating rotor disk supporting blades, stationary vanes located adjacent to the blades, and an axially extending rotor arm supported on the rotor disk and located radially inwardly from the blades. The seal assembly comprises a first seal member comprising an abradable structure supported on a radially inner end of the stationary vanes and having at least first and second seal portions radially spaced from each other, and a second seal member located on the rotor arm and comprising first and second seal surfaces located in facing relationship to the first and second seal portions, respectively. The first seal portion comprises axially spaced upstream and downstream edges located radially inwardly from the second seal portion and defines a width in an axial direction of the turbine engine that is less than the width of the second seal portion in the axial direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
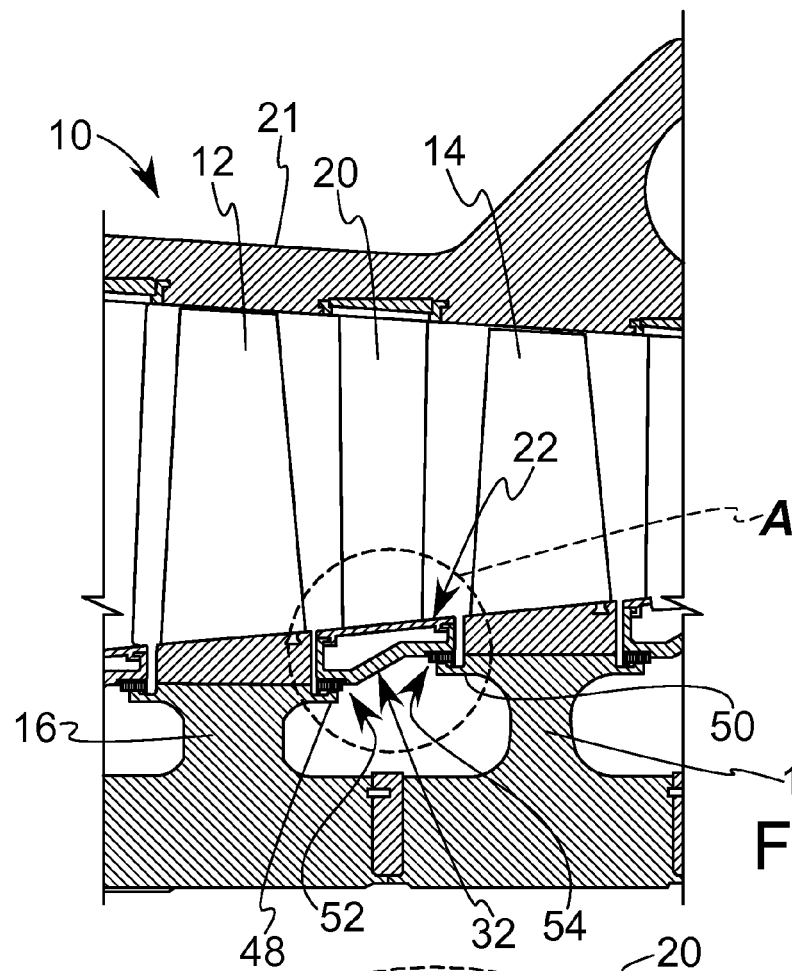
FIG. 1 is a cross-sectional side view of a portion of a compressor for a gas turbine engine incorporating the seal assembly of the present invention.

Further, although the present invention may be applicable to variety of rotary machinery, such as gas or steam turbines, compressors, etc., it will be described with reference to a gas turbine engine 10, a portion of which is illustrated in FIG. 1. In particular, the portion of the gas turbine engine 10 illustrated in FIG. 1 comprises a compressor portion of the turbine engine 10.

FIG. 1 illustrates two compressor blades 12, 14 connected to respective rotor disks 16, 18 of a rotor assembly supported for rotation about a rotational axis (not shown) of the gas turbine engine 10. A vane 20 is connected to the stationary casing 21 of the turbine engine 10 between the two compressor blades 12, 14, and the compressor blades 12, 14 may rotate relative to the vane 20 about the rotational axis of the turbine engine 10.

Figure 2:
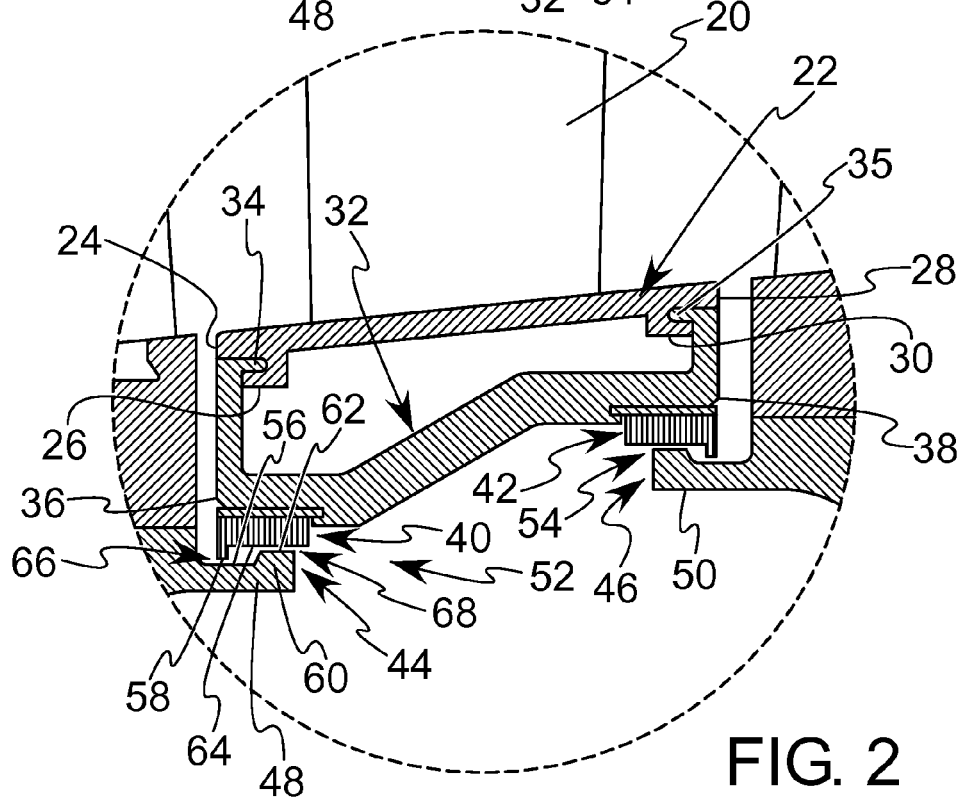
FIG. 2 is an enlarged view of area A in FIG. 1.

Referring to FIG. 2, the vane 20 includes an inner platform or inner shroud 22 comprising an upstream or front edge 24 defining a front annular spigot 26 and a downstream or rear edge 28 defining a rear annular spigot 30. A seal carrier 32 is supported radially inwardly from the vane 20 extending between the front and rear edges 24, 28 of the inner shroud 22. The seal carrier 32 includes a front flange portion 34 engaged with the front spigot 26, and a rear flange portion 35 engaged with the rear spigot 30 to thereby suspend the seal carrier 32 in close proximity to the rotor disks 16, 18.

An upstream lower edge 36 of the seal carrier 32 is depicted herein as being radially displaced from a downstream lower edge 38. However, it should be understood that the particular configuration of the seal carriers 32 provided in the turbine engine 10 may vary, depending on the location of a particular seal carrier 32 along the axial length of the turbine engine 10.

The seal carrier 32 supports one or more first seal members, represented by an upstream first seal member 40 and downstream seal member 42 for cooperating with respective upstream and downstream second seal members 44, 46. The upstream and downstream second seal members 44, 46 are formed on rotor arms 48, 50 extending axially from the respective rotor disks 16, 18. The upstream first and second seal members 40, 44 define an upstream seal assembly 52 and the downstream first and second seal members 42, 46 define a downstream seal assembly 54. The upstream and downstream seal assemblies 52, 54 comprise substantially similar constructions and are representative of the seal assemblies that may be provided throughout the turbine engine 10. Further description of the seal assemblies 52, 54 will be provided with particular reference to the upstream seal assembly 52, it being understood that the downstream seal assembly 54 has substantially similar elements facing in an axially opposite direction.

The second seal member 44 comprises an annular or cylindrical first seal surface 56, extending in the axial direction of the turbine engine 10. The first seal surface 56 is substantially smooth and defines a generally continuous cylindrical surface facing radially outwardly toward the first seal member 40. The first seal member 40 includes a first seal portion 58 located in facing relationship to the first seal surface 56 to define an outer seal location 66 for preventing or limiting passage of gases flowing in the axial direction.

The second seal member 44 further comprises a radially extending, relatively narrow rim portion 60. The rim portion 60 defines a stepped structure extending radially outwardly from the radial location of the first seal surface 56 and is shown located adjacent an end of the rotor arm 48. The rim portion 60 is substantially smooth and comprises a generally continuous cylindrical second seal surface 62 facing radially outwardly. The second seal surface 62 is located facing relationship toward a second seal portion 64 on the first seal member 40 to define an inner seal location 68.

The first and second seal surfaces 56, 62 of the second seal member 44 are located in spaced relation but closely adjacent to the first and second seal portions 58, 64 of the first seal member 40 to define the respective inner and outer seals 66, 68 for limiting passage of gases therethrough. As the turbine engine 10 is started up and reaches operating speed, the rotor arm 48 may move radially outwardly, closing the gap between the first and second seal members 40, 44. In an initial operating period after installation of the first seal member 40, there is a rub-in event during which the radial movement of the rotor arm 48 may cause the first and second seal surfaces 56, 62 of the second seal member 44 to contact the first and second seal portions 58, 64 of the first seal member 40, rubbing away or abrading pinch points of the first and second seal portions 58, 64 where they come in contact with the respective first and second seal surfaces 56, 62.

The rub-in event establishes a close operating clearance, or minimal sealing gap between the first and second seal members 40, 44. During subsequent operation of the turbine engine 10 following the rub-in event, the first and second seal members 40, 44 will generally remain in close, non-touching relation to each other during steady-state operation.

Figure 3:
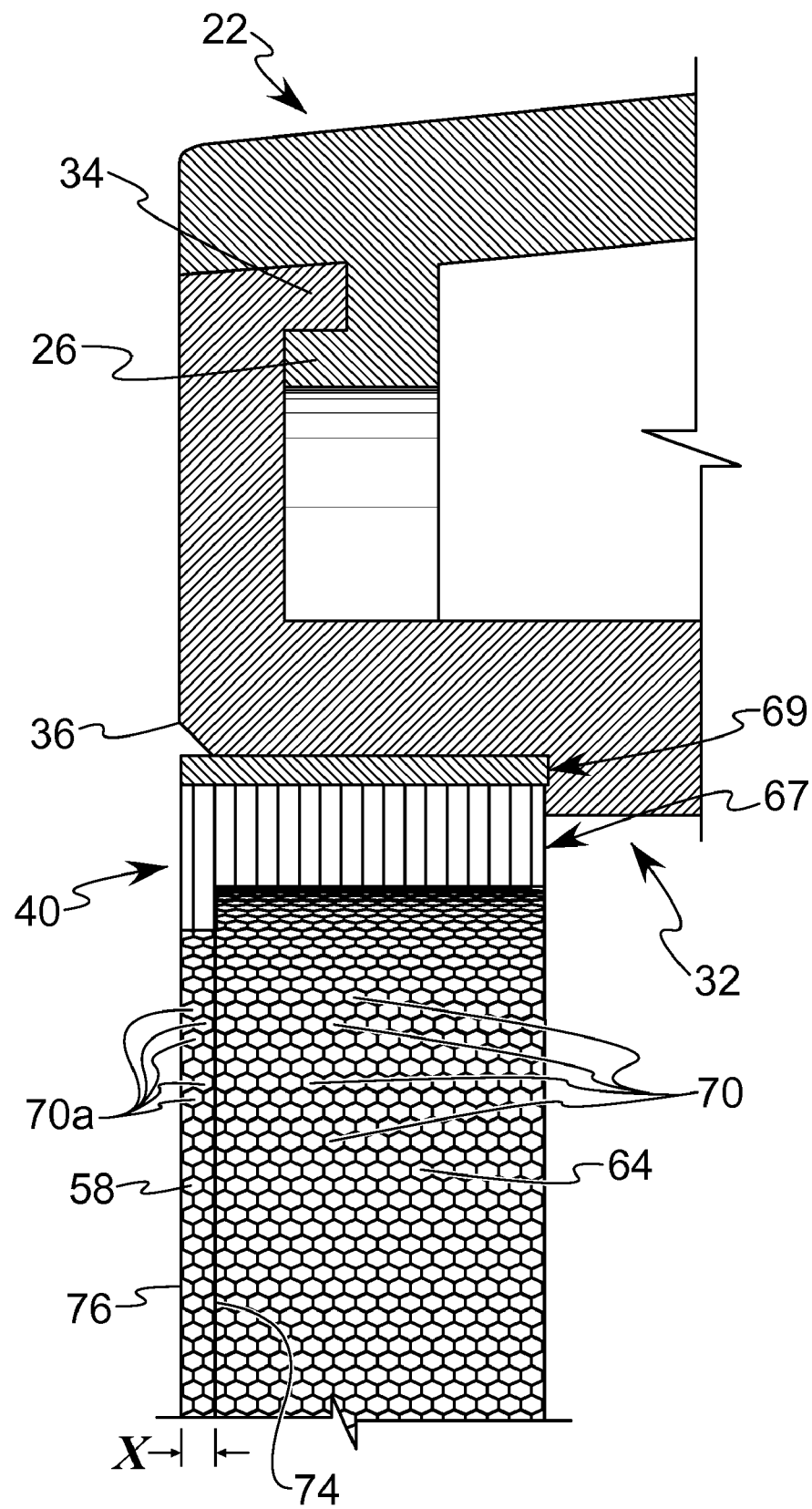
FIG. 3 is an enlarged cross-sectional side view of an abradable surface of a first seal member for the seal assembly.

Referring additionally to FIG. 3, the first seal member 40 is preferably defined by a honeycomb structure 67 attached to backing plate 69. The honeycomb structure 67 comprises a plurality of cells 70, each cell 70 having a longitudinal dimension extending radially from the seal carrier 32 and having an open end. The open ends of the cells 70 define the first and second seal portions 58, 64 located adjacent the first and second seal surfaces 56, 62 of the second seal member 44. The first seal portion 58 of the first seal member 40 comprises a fin-like structure at an outer edge 76 of the honeycomb structure 67, and is defined by a limited number of cells of the honeycomb structure 67, identified as 70a, extending a width X in the axial direction. Preferably, the width X of the first seal portion 58 comprises a narrow honeycomb width defined by approximately two rows of cells 70a in order to maintain structural integrity of the first seal portion 58. Due to the interfitting arrangement of the cells 70 of the honeycomb structure 67, the total width of the first seal portion 58 is approximately equal to one-and-a-half times the diameter of a cell 70a in the first seal portion 58, as measured in the axial direction between an inner edge 74 and the outer edge 76 of the first seal portion 58. Accordingly, the seal width comprising two cell rows provides a series of interconnected complete cells 70a around the annular area comprising the first seal portion 58.

The fin-like portion of the honeycomb structure 67 defined by the first seal portion 58 provides a relatively small or minimal annular surface area extending radially inwardly from the second seal portion 64 for engaging the first seal surface 56. Contact between the first seal portion 58 and the first seal surface 56 during the rub-in event may abrade the portion of the honeycomb structure 67 defining the first seal portion 58 to define a minimal clearance area at the outer seal location 66 during steady state operation of the turbine engine 10. The small engagement area between the first seal portion 58 and first seal surface 56 reduces the amount of material abraded from the first seal portion 58 and also reduces the heat produced during the rub-in event.

The second seal portion 64 defines a surface on the first seal member 40 having a width in the axial direction that is relatively wider than the width X of the first seal portion 58. However, the width of the second seal surface 62 on the rim portion 60 of the rotor arm 48 is relatively narrow in comparison to the portion of the rotor arm 48 defining the first seal surface 56. The second seal surface 62 presents a limited annular area for contacting an area of the second seal portion 64. The area of the second seal portion 64 contacted by the second seal surface 62 may be abraded during the rub-in event to define a small clearance area at the inner seal location 68 between the second seal portion 64 and the second seal surface 62.

Thermal effects in the turbine engine 10 may cause relative axial displacement between the second seal member 44 defined on the rotor arm 48 and the first seal member 40 supported on the stationary inner shroud 22, where the amount of axial travel is dependent on the particular axial location of the seal assembly in the turbine engine 10. The wider portions of the outer and inner seal locations 66, 68, i.e., the first seal surface 56 and the second seal portion 64, are preferably wide enough to accommodate axial travel of the second seal member 44 relative the first seal member 40 during operation of the turbine engine 10.

The radial distance of the first seal portion 58 from the second seal portion 64 is substantially equal to the radial distance of the second seal surface 62 from the first seal surface 56. Consequently, the initial clearance between the first seal portion 58 and the first seal surface 56 prior to the rub-in event is substantially the same as the initial clearance between the second seal portion 64 and the second seal surface 62. During the rub-in event, the first and second seal portions 58, 64 are both abraded by the respective substantially smooth surfaces 56, 62 of the second seal member 44 without producing excessive heat in the first and second seal members 40, 44. That is, each of the first and second seal surfaces 56, 62 described herein are provided as non-toothed surfaces for cooperating with the respective first and second seal portions 58, 64 defined on the honeycomb structure 67. Further, during transient rotational and thermal conditions that may occur during operation of the turbine engine 10, the first and second seal portions 58, 64 will accommodate further contact with the first and second seal surfaces 56, 62 by abrading at pinch points between the stationary and rotating components.

The honeycomb structure 67 forming the first seal member 40 described herein is preferably constructed of a corrosion resistant material. In the embodiment described herein the honeycomb structure 67 is formed of a nickel-based alloy, such as HASTELLOY®. The first seal member 40 may be attached to the seal carrier 32 by any conventional attachment method. For example, the first seal member 40 may be welded or brazed to the seal carrier 32.

Since the described seal assembly provides a thin fin-like seal portion of the honeycomb structure 67, as defined at the first seal portion 58, and does not require seal teeth formed on the cooperating rotor arm surface 56, the first seal member 40 may be readily retro-fit to existing turbine engines 10 to cooperate with rotor arms having substantially smooth seal surfaces It should be understood that, within the scope of the present invention, one or more surfaces of the rotor arm 48 may be provided with alternative configurations for cooperating with the first seal member 40. For example, the second seal surface 62 of the second seal member 44 is not limited to the cylindrical surface illustrated for the present description, and may comprise a very thin surface, e.g., a thin fin or tooth-like surface, for engaging a limited surface area of the opposing second seal portion 64.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly for a turbine engine comprising a rotating rotor disk supporting blades, stationary vanes located adjacent to said blades, and an axially extending rotor arm supported on said rotor disk and located radially inwardly from said blades, the seal assembly comprising:
   a first seal member comprising a honeycomb structure supported on a radially inner end of said stationary vanes;
   a second seal member located on said rotor arm and comprising first and second seal surfaces wherein said second seal surface is radially spaced from said first seal surface, and said first and second seal surfaces are each substantially cylindrical surfaces, extending in the axial direction;
   said first seal member including a first seal portion located in facing relationship to said first seal surface to form a seal therebetween, and a second seal portion located in facing relationship to said second seal surface to form a seal therebetween; and
   said first seal portion comprising axially spaced upstream and downstream edges located radially inwardly from said second seal portion and defining a width in an axial direction of said turbine engine that is less than the width of said second seal portion in the axial direction.

2. The seal assembly of claim 1, wherein said first seal surface comprises a surface contacted by said first seal portion during rotatable movement of said rotor disk of said turbine engine.

3. The seal assembly of claim 2, wherein said first seal surface is a non-toothed surface.

4. The seal assembly of claim 1, wherein said rotor arm has a radially extending end portion, said radially extending end portion extending from said first seal surface, and said second seal surface being defined on said end portion.

5. The seal assembly of claim 4, wherein said first seal member is mounted on a stationary seal carrier located on said radially inner end of said stationary vanes and located radially outwardly from said rotor arm.

6. A seal assembly for a turbine engine comprising a rotating rotor disk supporting blades, stationary vanes located adjacent to said blades, and an axially extending rotor arm supported on said rotor disk and located radially inwardly from said blades, the seal assembly comprising:
   a first seal member comprising a honeycomb structure supported on a radially inner end of said stationary vanes;
   a second seal member located on said rotor arm and comprising first and second seal surfaces wherein said second seal surface is radially spaced from said first seal surface;
   said first seal member including a first seal portion located in facing relationship to said first seal surface to form a seal therebetween, and a second seal portion located in facing relationship to said second seal surface to form a seal therebetween;

said first seal portion comprising axially spaced upstream and downstream edges located radially inwardly from said second seal portion and defining a width in an axial direction of said turbine engine that is less than the width of said second seal portion in the axial direction; and wherein the width of said first seal portion of said first seal member is less than the width of said first seal surface, said first seal surface extending axially along said rotor arm past said upstream and downstream edges of said first seal portion.

7. The seal assembly of claim 6, wherein the width of said second seal portion is greater than the width of said second seal surface.

8. The seal assembly of claim 6, wherein the width of said first seal portion is approximately equal to two rows of cells that is one-and-a-half times the diameter of a cell of said honeycomb structure.

9. A seal assembly for a turbine engine comprising a rotating rotor disk supporting blades, stationary vanes located adjacent to said blades, and an axially extending rotor arm supported on said rotor disk and located radially inwardly from said blades, the seal assembly comprising:

a first seal member comprising an abradable structure supported on a radially inner end of said stationary vanes and having at least first and second seal portions radially spaced from each other;

a second seal member located on said rotor arm and comprising first and second seal surfaces located in facing relationship to said first and second seal portions, respectively, wherein said rotor arm includes a radially extending end portion, said radially extending end portion extending from said first seal surface, and said second seal surface being defined on said end portion; and said first seal portion comprising axially spaced upstream and downstream edges located radially inwardly from said second seal portion and defining a width in an axial direction of said turbine engine that is less than the width of said second seal portion in the axial direction.

10. The seal assembly of claim 9, wherein said first seal surface is located for engagement with said first seal portion.

11. The seal assembly of claim 10, wherein said first seal portion comprises a honeycomb structure.

12. The seal assembly of claim 11, wherein said first seal portion has a width in the axial direction that is approximately one-and-a-half times the diameter of a cell of said honeycomb structure.

13. The seal assembly of claim 10, wherein said abradable structure comprises a honeycomb structure.

14. The seal assembly of claim 9, wherein said abradable structure comprises a honeycomb structure and said first and second seal surfaces are non-toothed surfaces.

* * * * *

UNITED STATES PATENT AND TRADEMARK OFFICE
CERTIFICATE OF CORRECTION

| | | |
|---|---|---|
| PATENT NO. | : 7,857,582 B2 | Page 1 of 1 |
| APPLICATION NO. | : 12/370918 | |
| DATED | : December 28, 2010 | |
| INVENTOR(S) | : Kovac et al. | |

It is certified that error appears in the above-identified patent and that said Letters Patent is hereby corrected as shown below:

On the Title Page, and Col. 1, line 1

The title should read:

ABRADABLE LABYRINTH TOOTH SEAL VANE SHROUD THROUGH FLOW-PLATFORM COVER

Signed and Sealed this
First Day of March, 2011

David J. Kappos
*Director of the United States Patent and Trademark Office*